(12) United States Patent
McDougal et al.

(10) Patent No.: US 7,769,153 B1
(45) Date of Patent: Aug. 3, 2010

(54) SYSTEM AND METHOD FOR AUTOMATED ROUTING AND PROCESSING OF TELECOMMUNICATION SERVICE ORDERS

(75) Inventors: Harold Lester McDougal, Lenexa, KS (US); Stan Neidecker, Olathe, KS (US); Michael A. Gregory, Belton, MO (US)

(73) Assignee: Embarq Holdings Company, LLP, Overland Park, KS (US)

( * ) Notice: Subject to any disclaimer, the term of this patent is extended or adjusted under 35 U.S.C. 154(b) by 1808 days.

(21) Appl. No.: 10/610,117

(22) Filed: Jun. 30, 2003

(51) Int. Cl.
*H04M 3/42* (2006.01)

(52) U.S. Cl. ............... 379/201.03; 379/201.01; 379/201.02; 379/201.12

(58) Field of Classification Search ............ 379/265.02, 379/202.01, 201.12, 201.03, 201.02; 705/8, 705/26; 709/224; 700/101
See application file for complete search history.

(56) References Cited

U.S. PATENT DOCUMENTS

| | | | |
|---|---|---|---|
| 4,456,788 A | 6/1984 | Kline et al. | |
| 4,669,113 A | 5/1987 | Ash et al. | |
| 4,756,019 A | 7/1988 | Szbicki | |
| 5,054,096 A | 10/1991 | Beizer | |
| 5,526,408 A | 6/1996 | Yekutiely | |
| 5,687,224 A * | 11/1997 | Alley et al. | 379/201.12 |
| 5,844,823 A | 12/1998 | Mishra | |
| 5,884,284 A | 3/1999 | Peters et al. | |
| 5,999,932 A | 12/1999 | Paul | |
| 6,028,924 A | 2/2000 | Ram et al. | |
| 6,104,798 A | 8/2000 | Lickiss et al. | |
| 6,122,632 A | 9/2000 | Botts et al. | |
| 6,137,873 A * | 10/2000 | Gilles | 379/202.01 |
| 6,219,648 B1 | 4/2001 | Jones et al. | |
| 6,226,286 B1 | 5/2001 | Danne et al. | |
| 6,285,748 B1 | 9/2001 | Lewis | |
| 6,349,238 B1 * | 2/2002 | Gabbita et al. | 700/101 |
| 6,385,609 B1 | 5/2002 | Barshefsky et al. | |
| 6,389,126 B1 | 5/2002 | Bjornberg et al. | |
| 6,647,105 B1 * | 11/2003 | Gilles | 379/201.12 |
| 6,707,903 B2 | 3/2004 | Burok et al. | |

(Continued)

FOREIGN PATENT DOCUMENTS

EP 1 235 415 A2 2/1998

OTHER PUBLICATIONS

Non-Final Office Action dated Jan. 8, 2008 for U.S. Appl. No. 10/610,191.

(Continued)

*Primary Examiner*—Thjuan K Addy
(74) *Attorney, Agent, or Firm*—Sonnenschein Nath & Rosenthal LLP (57) ABSTRACT

The present invention provides a system and method for the automated routing and processing of telecommunication service orders. A system and method in accordance with the present invention may further prioritize the analysis and processing of telecommunication service orders, identify and classify past due telecommunication service orders for analysis and processing, and manage the order of completion of components of a telecommunication service order. A system and process in accordance with the present invention receives a service order and parses it to find messages on the service order that are included on a message table. Analysis rules provide actions to be taken with a service order based on the messages found in the service order.

27 Claims, 5 Drawing Sheets

U.S. PATENT DOCUMENTS

| | | | |
|---|---|---|---|
| 6,724,876 | B2 | 4/2004 | Williams et al. |
| 6,778,638 | B1 | 8/2004 | Jean et al. |
| 6,865,268 | B1 | 3/2005 | Matthews et al. |
| 6,937,701 | B1 | 8/2005 | Gold |
| 6,937,993 | B1 * | 8/2005 | Gabbita et al. ............... 705/8 |
| 7,142,655 | B2 | 11/2006 | Malinowski et al. |
| 7,221,912 | B2 | 5/2007 | Nelson et al. |
| 7,289,605 | B1 | 10/2007 | Jean et al. |
| 7,308,094 | B1 | 12/2007 | Jean et al. |
| 7,660,402 | B1 | 2/2010 | Dwekat et al. |
| 2002/0111842 | A1 | 8/2002 | Miles |
| 2003/0046184 | A1 * | 3/2003 | Bjorklund et al. ............ 705/26 |
| 2003/0130820 | A1 | 7/2003 | Lane, III |
| 2004/0024862 | A1 * | 2/2004 | Wall et al. .................. 709/224 |
| 2004/0267586 | A1 | 12/2004 | McDougal et al. |

OTHER PUBLICATIONS

Response filed Apr. 8, 2008 to Non-Final Office Action dated Jan. 8, 2008 for U.S. Appl. No. 10/610,191.
Notice of Non-Compliant Amendment dated Aug. 11, 2008 for U.S. Appl. No. 10/610,191.
Response filed Sep. 3, 2008 to Notice of Non-Compliant Amendment dated Aug. 11, 2008 for U.S. Appl. No. 10/610,191.
Non-Final Office Action dated Jul. 9, 2007 for U.S. Appl. No. 10/610,208.
Response filed Nov. 9, 2007 to Non-Final Office Action dated Jul. 9, 2007 for U.S. Appl. No. 10/610,208.
Final Office Action dated Feb. 7, 2008 for U.S. Appl. No. 10/610,208.
Response filed May 7, 2008 to Final Office Action dated Feb. 7, 2008 for U.S. Appl. No. 10/610,208.
Non-Final Office Action dated Jun. 12, 2008 for U.S. Appl. No. 10/610,208.
Response filed Jul. 18, 2008 to Non-Final Office Action dated Jun. 12, 2008 for U.S. Appl. No. 10/610,208.
Non-Final Office Action dated Dec. 20, 2007 for U.S. Appl. No. 10/610,118.
Response filed Mar. 18, 2008 to Non-Final Office Action dated Dec. 20, 2007 for U.S. Appl. No. 10/610,118.
Non-Final Office Action dated Jul. 28, 2008 for U.S. Appl. No. 10/610,118.
Response filed Oct. 16, 2008 to Non-Final Office Action dated Jul. 28, 2008 for U.S. Appl. No. 10/610,118.
Non-Final Office Action dated Apr. 3, 2008 for U.S. Appl. No. 10/715,781.
Response filed Jul. 1, 2008 to Non-Final Office Action dated Apr. 3, 2008 for U.S. Appl. No. 10/715,781.
"Pulsar's WavPort Voice-Activated Services", http://www.lynuxworks.com/solutions/telecom/inaction/pulsar.php3, 3 pages, Submitted on Nov. 24, 2008.
Final Office Action dated Oct. 17, 2008 for U.S. Appl. No. 10/715,781.
RCE/Amendment filed Feb. 5, 2010 in U.S. Appl. No. 10/610,191.
Non-Final Rejection date mailed Feb. 18, 2010 in U.S. Appl. No. 10/610,191.
Final Office Action date mailed Nov. 26, 2008 in U.S. Appl. No. 10/610,191.
RCE/Response filed Jan. 23, 2009 to Final Office Action date mailed Nov. 26, 2008 in U.S. Appl. No. 10/610,191.
Non-Final Rejection date mailed Apr. 9, 2009 in U.S. Appl. No. 10/610,191.
Response filed May 26, 2009 to Non-Final Rejection date mailed Apr. 9, 2009 in U.S. Appl. No. 10/610,191.
Final Office Action date mailed Oct. 6, 2009 in U.S. Appl. No. 10/610,191.
Pre-Brief Conference Request and Remarks to Same; Notice of Appeal filed Nov. 12, 2009 in U.S. Appl. No. 10/610,191.
Pre-Brief Appeal Conference Decision date mailed Jan. 6, 2010 in U.S. Appl. No. 10/610,191.
Final Office Action date mailed Nov. 28, 2008 in U.S. Appl. No. 10/610,208.
Response filed Dec. 29, 2008 to Final Office Action date mailed Nov. 28, 2008 in U.S. Appl. No. 10/610,208.
Advisory Action date mailed Jan. 28, 2009 in U.S. Appl. No. 10/610,208.
Non-Final Rejection date mailed Mar. 6, 2009 in U.S. Appl. No. 10/610,208.
Response filed Jun. 1, 2009 to Non-Final Action date mailed Mar. 6, 2009 in U.S. Appl. No. 10/610,208.
Final Rejection date mailed Sep. 10, 2009 in U.S. Appl. No. 10/610,208.
Response filed Sep. 30, 2009 to Final Rejection dated Sep. 10, 2009 in U.S. Appl. No. 10/610,208.
Advisory Action date mailed Oct. 9, 2009 in U.S. Appl. No. 10/610,208.
RCE/Amendment filed Oct. 27, 2009 in U.S. Appl. No. 10/610,208.
Non-Final Rejection date mailed Dec. 18, 2009 in U.S. Appl. No. 10/610,208.
Response filed Jan. 12, 2010 to Non-Final Rejection date mailed Dec. 18, 2009 in U.S. Appl. No. 10/610,208.
Final Office Action date mailed Dec. 24, 2008 in U.S. Appl. No. 10/610,118.
RCE/amendment filed Mar. 24, 2009 in U.S. Appl. No. 10/610,118.
Non-Final Rejection date mailed Apr. 14, 2009 in U.S. Appl. No. 10/610,118.
Response filed Jul. 14, 2009 to Non-Final Rejection date mailed Apr. 14, 2009 in U.S. Appl. No. 10/610,118.
Final Rejection date mailed Nov. 24, 2009 in U.S. Appl. No. 10/610,118.
Pre-Appeal Brief filed Jan. 8, 2009 to Final Office Action dated Oct. 17, 2008 in U.S. Appl. No. 10/715,781.
Pre-Brief Appeal Conference Decision date mailed Apr. 9, 2009 in U.S. Appl. No. 10/715,781.
Non-Final Rejection date mailed Jun. 25, 2009 in U.S. Appl. No. 10/715,781.
Response filed Aug. 11, 2009 to Non-Final Rejection date mailed Jun. 25, 2009 in U.S. Appl. No. 10/715,781.
Notice of Allowance date mailed Oct. 19, 2009 in U.S. Appl. No. 10/715,781.

* cited by examiner

SYSTEM AND METHOD FOR AUTOMATED ROUTING AND PROCESSING OF TELECOMMUNICATION SERVICE ORDERS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to systems and methods for fulfilling telecommunication service orders. More particularly, the present invention relates to a system and method for analyzing telecommunication service orders, automatically routing and processing telecommunication service orders, the prioritization of telecommunication service orders, and the identification and classification of past due telecommunication service orders.

BACKGROUND OF THE INVENTION

The receipt, analysis, routing, processing, and completion of telecommunication service orders can be a complex process for a telecommunication service provider. Telecommunication service orders indicate that the receiving telecommunication service provider is to make changes in telecommunication service as indicated on the service order. A telecommunication service order may, for example, be for the creation or change of telecommunication services used by a customer. While a telecommunication service order may be for the establishment of new telephone service for a customer, it may also be for the addition of services to an existing account, for the modification of rates or calling plans, or any other modification of a customer's telecommunication services. It should be noted that orders may be initiated by the customer, may be initiated by another telecommunication service provider seeking to utilize service provider's resources, or from the telecommunication service provider itself for a variety of reasons.

No matter where a telecommunication service order originates from, and no matter how the order is received, it must be processed by a telecommunication service provider in order to correctly establish the required service. A variety of steps may be required to complete an order, and the order in which steps are performed may or may not matter to the completion process. Some service orders may require immediate processing, while other orders may be capable of processing only when time and resources are available. For a variety of reasons, some orders may not be completed by their due date, in which case identifying, categorizing, and analyzing those orders may be useful to both the completion of the outstanding orders and to the prevention of future processing difficulties. As a further complication to the order fulfillment process, the fulfillment of a telecommunication service order may require the involvement of external organizations, such as competitive local exchange carriers, often referred to as CLECs, and may further involve a variety of personnel, groups, and systems within the telecommunication service provider. In the interest of accuracy and efficiency, it is beneficial to perform the completion and routing of orders in an automated fashion. Accordingly, an improved system and method for the automated routing and processing of telecommunication service orders is desirable.

BRIEF SUMMARY OF THE INVENTION

The present invention provides a system and method for receiving, analyzing, routing, processing, and completing telecommunication service orders. The system and method in accordance with the present invention may further prioritize the analysis and processing of telecommunication service orders, identify and classify past due telecommunication service orders for analysis and processing, and manage the order of completion of components of a telecommunication service order. A system uses a method in accordance with the present invention receives telecommunication service orders in the form of digital images that are scanned to determine what messages are found in the order. Scanning may be a multi-step process in accordance with the present invention. Depending upon the messages that are found in a telecommunication service order, the telecommunication service order may be assigned a higher or lower priority, may be processed in a variety of ways, or may be routed to various internal and external organizations via a variety of means for further processing. A system and method in accordance with the present invention may further identify the steps necessary to complete a telecommunication service order and may determine whether those steps must be completed in a particular order. If so, the system and method in accordance with the present invention may manage the processing of work to complete the telecommunication service order to assure that the necessary steps are undertaken in the proper order.

BRIEF DESCRIPTION OF THE SEVERAL VIEWS OF THE DRAWING

The present invention is described below with reference to the attached drawing figures, wherein.

DETAILED DESCRIPTION OF THE INVENTION

Figure 1A:
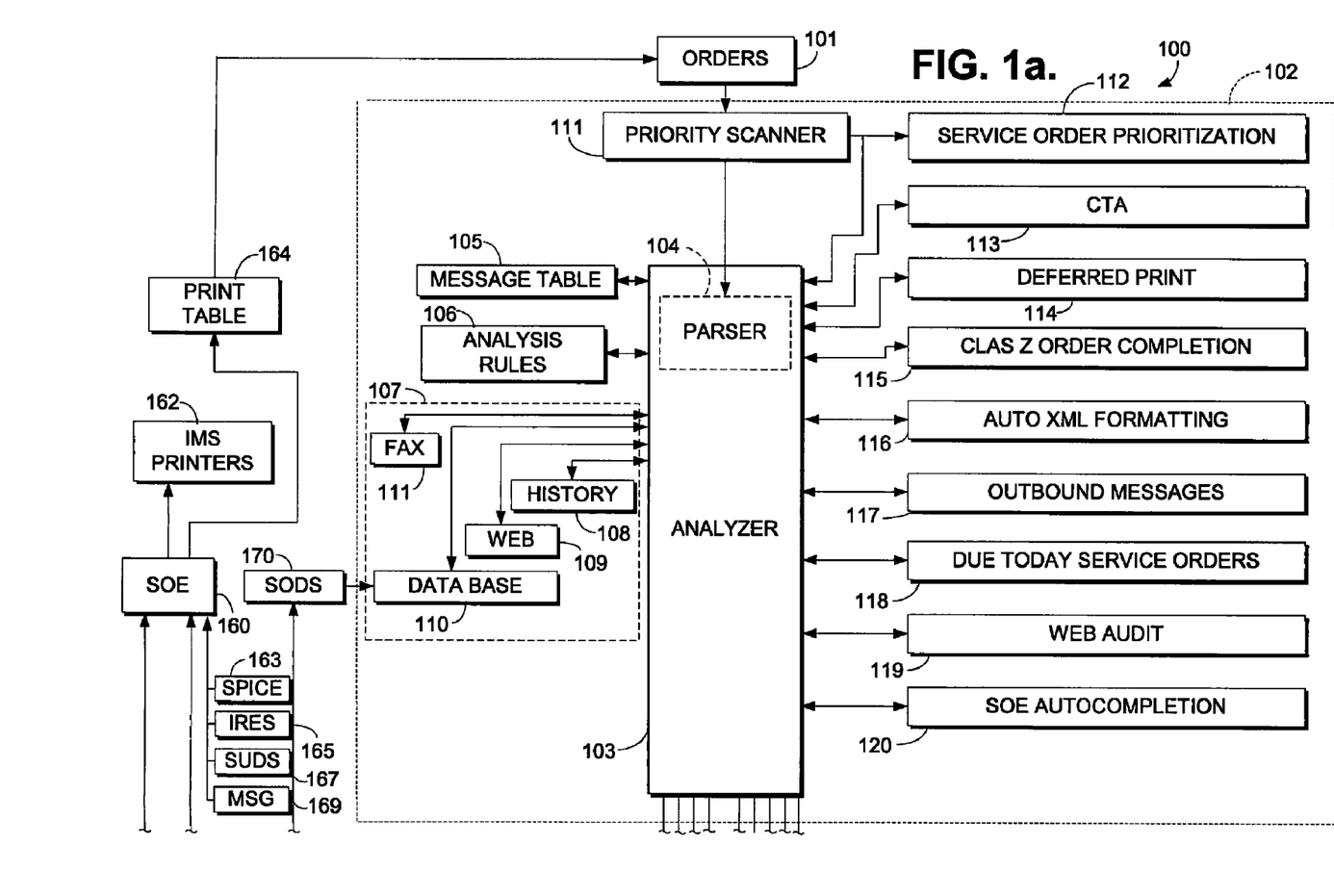
FIG. 1a and FIG. 1b illustrate a system and method for the automated routing and completion of telecommunication service orders.
Figure 1B:
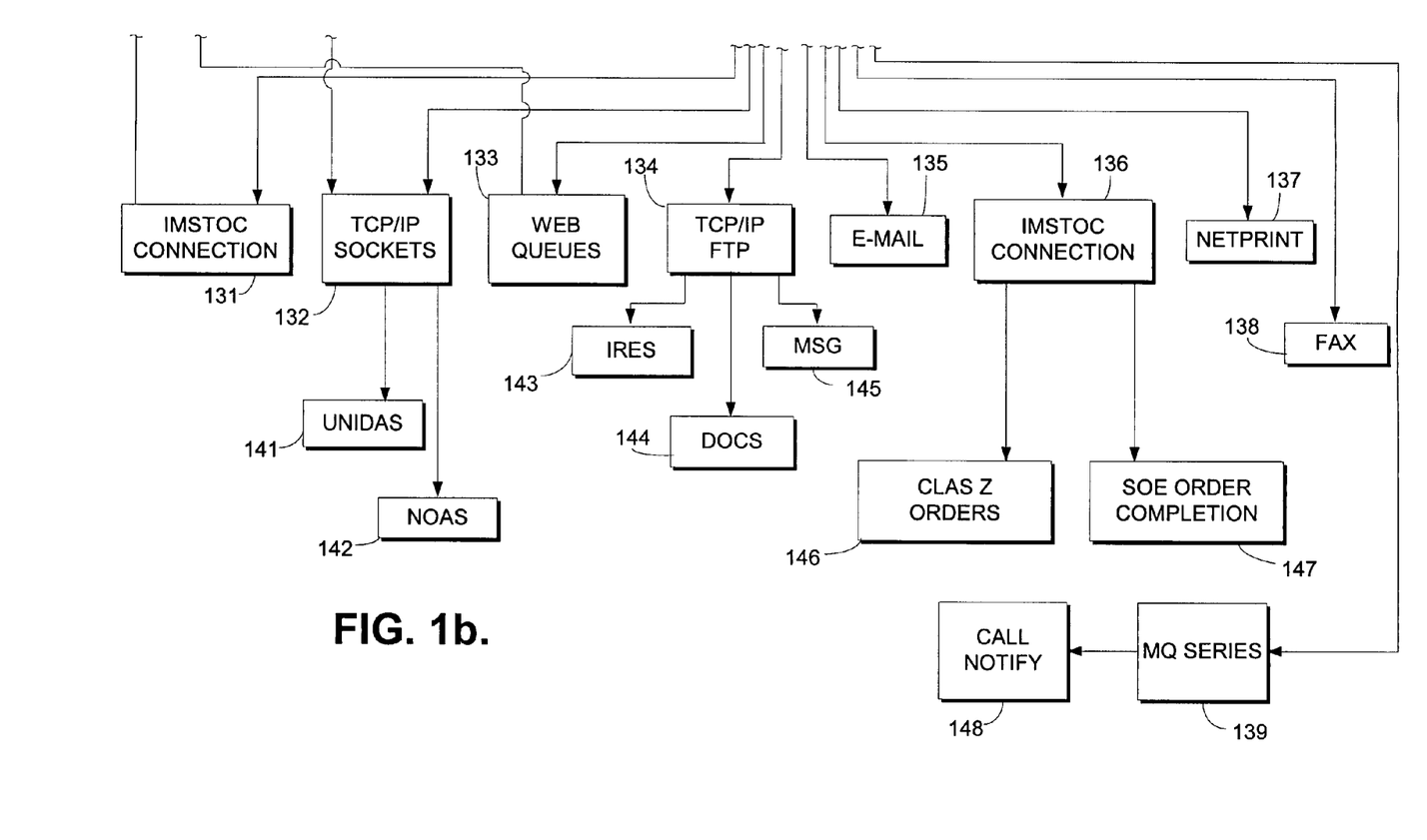

Referring now to FIG. 1a and FIG. 1b, a system and method 100 for the automated routing and processing of telecommunication orders is illustrated. System 100 analyzes and processes telecommunication service orders 101. Service orders 101 may be any change to a customer's telecommunication service, including the creation of new service. Service orders may originate in a variety of ways. As illustrated in FIG. 1a, an automated system referred to as Service Order Entry or SOE 160 may place service orders in a print table 164, which then provides service orders 101 for processing by the automated routing and completion unit 102. SOE 160 may generate service orders based upon input from a variety of interfaces, such as SPICE 163, an integrated request entry system of IRES 165, and/or a universal directory system of SUDS 167. These interfaces may receive input from a variety of sources, such as clerks at call centers and automated systems. While specific examples of an automated system and interfaces with that automated system are provided herein it should be realized that any system and interface may be used in accordance with the present invention to create service orders, and that the system and interface may be unitary.

Service orders 101 may, in accordance with the present invention, comprise a digital image of text describing the changes and work required to fulfill that service order 101. Information included in a service order 101 may include identifying information such as the customer name, the customer telephone number, and the customer account number, network information such as the wire center serving the customer, information describing customer billing rates, and information describing value added services, such as call waiting, that a customer has selected. A service order 101 may also include information identifying a due date by which the service order is to be completed. Information in a service order may be thought of as being contained in messages found in a service order.

Service orders 101 may be received by an automated routing and completion unit (ARC) 102. The automated routing and completion unit 102 may include a variety of components, some of which are illustrated in FIG. 1a. It should be realized that additional elements may be added to ARC 102 beyond those illustrated in FIG. 1a. Moreover, it should be realized that elements illustrated as being within ARC 102 in FIG. 1a may be physically or functionally located external to ARC 102. It should further be realized that components illustrated as being external to ARC 102 in FIG. 1a and FIG. 1b may be physically and/or functionally integral to ARC 102 in various embodiments of the present invention.

An analyzer 103 may determine how to route and process a service order to complete it. Analyzer 103 determines how to proceed with a service order by matching messages found in a service order with messages in a message table 105 and applying analysis rules 106 that determine what actions to take based upon the messages found or not found in the service order. Parser 104 may utilize any image processing method or technique to recognize messages found in the digital images of service orders. Parser 104 is used by analyzer 103 to identify what messages are found in a particular service order. Analyzer 103 may identify where messages are found on a service order, and may identify messages in proximity to one another. It should be appreciated that the system 100, ARC 102, analyzer 103, parser 104, and the other components and functions of the present invention may be implemented as multi-threaded software operating on one or more computers, with the various functions described herein operating as separate threads in the processing of a telecommunication service order.

Before an order is processed by parser 104 and analyzer 103, it may first pass through a priority scanner 111. Priority scanner 111 may function in a fashion similar to parser 104 to identify messages found in a service order. Priority scanner 111 may work in conjunction with a service order prioritization component 112 to determine what priority to assign to a service order. While priority scanner 111 and parser 104 may be combined, it may often be useful to separate them so that priority scanner 111 can be used to identify a limited number of predefined messages that may be used to indicate the priority to be assigned to a service order. Any prioritization system may be employed with the present invention. In a three level prioritization system, the prioritization component may determine whether a service order should be treated as an emergency, should be treated normally, or should be deferred for processing only when resources are available. A method of implementing service order prioritization is further described below with reference to FIG. 2.

ARC 102 may also include servers 107. Servers 107 may include a history server 108 that retains a record of service orders processed by ARC 102, a web server 109 that may be used to create web queues as described below, a database server 110, and a fax server 111 for use in automated facsimile transmission as described below.

Analyzer 103 may receive service orders in either a prioritized or non-prioritized fashion. Whether service orders are received in a prioritized or non-prioritized fashion need not effect how analyzer 103 operates on a service order. Analyzer 103 may determine that a service order should be routed externally for processing. System 100 provides a variety of means to route that order. Analyzer 103 may route the order to faxing 138 to transmit the order. Faxing 138 may use automated faxing resources, such as a fax server 111, to generate and transmit facsimiles, but faxing 138 may also be performed using manually operated fax machines. If used, a fax server 111 may be a Biscom fax server. Faxing 138 may be particularly useful for routing service orders for processing to third parties, such as CLECs, that are unable to exchange information with the telecommunication service provider electronically.

A service order may also be routed to a printer using network printing facilities 137. Network printing facilities 137 may be used to direct an order to a group or personnel within the telecommunication service provider that must perform work to complete a service order. The use of network printing capabilities 137 places a physical copy of the service order, or a relevant portion of the service order, with the individuals within the telecommunication service provider responsible for completing the service order.

A service order may also be transmitted using e-mail facilities 135. Whether a service order is placed as an attachment or within the body of an e-mail is immaterial to the present invention. The use of e-mail facilities 135 allows the transmission of a service order either within or outside of a telecommunication service provider.

A service order may also be routed to a web queue 133. A web queue 133 may be generated on a web server 109, that may comprise any server capable of receiving maintaining, and allowing others to access data in a web based format. A display of orders in a web queue 133 may be viewed by any authorized personnel with a computer having appropriate network connection to the system 100 using a web browser. While the use of web queue 133 may be particularly useful to allow personnel of a telecommunication service provider to internally access order information, it may also be useful to allow external parties to access service order information.

Service orders may also be routed over an IMSTOC connection 136. An IMSTOC connection, also referred to as an IMS TCP/IP OTMA connection is a means for connecting two dissimilar computer systems. IMSTOC connection 136 may be used to access orders on other systems, such as CLAS Z order completion 115 and SOE order completion 147, for processing. CLAS Z order completion 115 may be a computer system for facilitating and managing physical facilities used to deliver telecommunication services. CLAS Z order completion 115 may, for example, receive service orders requiring physical work and then automatically complete them. Service orders may be routed using network protocols such as TCP/IP FTP 134, which may be used to route service orders to other systems such as IRES 143, DOCS 144, and MSG 145. IRES 143 may be an Integrated Request Entry System and may be a web based system for transmitting service orders to CLECs. DOCS 144 may be a Distributive Online Correspondence System that provides a web based document management system. MSG 145 may be an external system used to manipulate and generate service orders. Network protocols such as TCP/IP Sockets 132 may also be used to route service orders. Service orders may be routed using TCP/IP Sockets 132 to other systems such as UNIDAS 141 and NOAS 142. UNIDAS 141 may be a Universal Directory Assistance system that provides directory assistance information. NOAS 142 may be a National Order Administration and Statistics system that provides a web based interface to one or more other systems. TCP/IP Sockets 132 may also be used to communicate with external automated completion systems such as SODS 170. SODS 170 may be a Service Order Download system responsible for updating digital switches within a telephony network. SODS 170 may both perform switch work and may generate completion notices indicating that the required switch work is completed. An additional IMSTOC connection 131 may also be used to complete service orders using an automated system such as SOE 160. SOE 160 may be a Service Order Entry system that may be used to route service orders within the telecommunication service provider to IMS printers 162. SOE 160 may also create service orders, which it places in a print table 164 that are then passed to the service orders 101 for processing.

Analyzer 103 may determine that, either prior to, in addition to, or instead of routing a service order, further processing of the service order is needed. For example, analyzer 103 may initiate a thread to route orders to the call notify process 121 using MQ series 139. The call notify process 121 will telephone a customer to confirm that their service order is complete. Analyzer 103 may also initiate SOE auto completion 120. SOE auto completion 120 will determine whether all or part of a service order may be completed by ARC 102. Analyzer 103 may insert information to the web audit 119 for all or some service orders. Web audit 119 may be used to determine the treatment, disposition, and number of service orders processed in a given time frame. Analyzer 103 may also initiate the due today service order process 118. While the due today service order process 118 may take a variety of forms, this thread may initiate at a particular time of day, for example at two o'clock p.m., and identify service orders due that day that have yet to be completed.

The due today service order process 118 may then generate a list or lists of service orders due that day for routing to various entities or groups using methods such as those described herein. Such a list may be useful for a variety of purposes, such as personnel management and process planning purposes, for example by identifying that a high volume of orders need to be completed on a particular evening early enough to allow the telecommunication service provider to secure sufficient personnel to process those service orders.

The outbound message process 117 may be used to add additional messages to a service order before it is routed. The outbound message process 117 may be utilized in a variety of fashions. For example, outbound message process 117 may be used to fill omissions in a service order, what ever the source of those omissions. Outbound message process 117 may also be utilized to provide special instructions to the recipient of a service order due to special circumstances identified by analyzer 103.

The auto XML formatting process 116 may be used to format a digital image of a service order into an XML document. The auto XML formatting process 116 may be useful, for example, prior to routing a service order via e-mail or other means to a recipient for further processing.

The CLAS Z order completion process 115 allows for the identification of steps in the order completion process that must be completed prior to initiating subsequent steps. The CLAS Z order completion process 115 is described further below with reference to FIG. 4.

The deferred print process 114 allows the identification of a service order for printing at a subsequent time. For example, the deferred print process 114 may be utilized to print a service order using any of the various appropriate routing methods a predetermined amount of time prior to the service order due date.

The CTA process 113, also referred to as the Customer Trip Activity process, may allow the identification and processing of past due orders. The CTA process 113 is further described in reference to FIG. 3.

The service order prioritization process 112, which may be initiated using a priority scanner 111 that reviews an order prior to passing it to the parser 104, was described briefly above. The service order prioritization process 112 may be used to prioritize the processing of received service orders, and is described further below in conjunction with FIG. 2.

Figure 2:
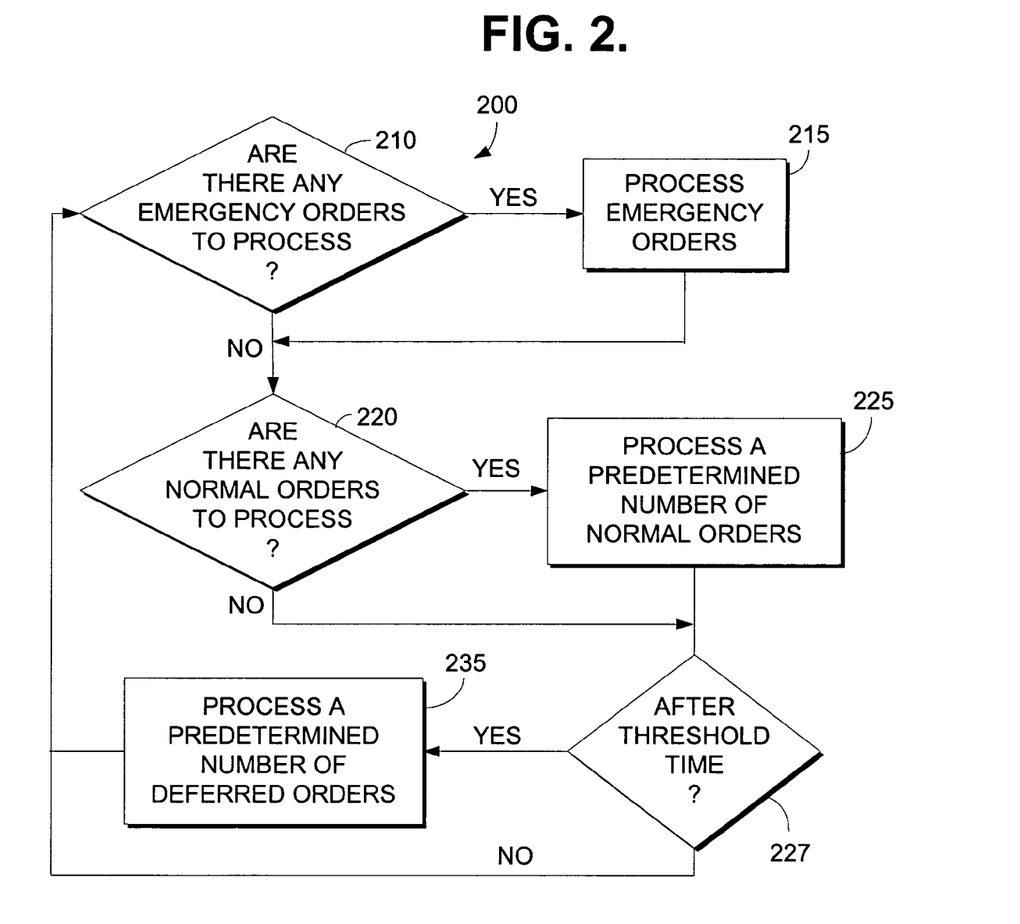
FIG. 2 illustrates a method for the prioritized processing of telecommunication service orders.

Referring now to FIG. 2, a method 200 for prioritizing the processing of service orders is illustrated. Method 200 illustrates the use of three priorities: emergency, normal, and deferred. Any number of priorities greater than or equal to two may be used in conjunction with the present invention. For exemplary purposes, three service order priority types are considered in conjunction with method 200.

A service order assigned a normal priority may be analyzed in accordance with the normal processing procedures employed in a system in accordance with the present invention. For example, a first-in first-out process may be used. Service orders assigned an emergency priority may be orders that should be processed as soon as possible. Emergency service orders may be designated as such for a variety of reasons, such as extremely urgent due dates or the manual identification of the order status by personnel entering the service order. As described below, an emergency service order may be processed before other, lower priority, service orders.

Service orders assigned a deferred priority may be service orders that require processing only when system resources are available. For example, billing and routing changes may require that a high volume of service orders be processed to implement those changes. However, such service orders may typically be of a nature that they do not impact the service provided to a customer or the cost to a customer if they are not processed within a short period of time. Because such a high volume of service orders may overwhelm a system, which could interfere with the processing of other service orders, and because such deferred priority service orders do not require immediate processing, a system in accordance with the present invention may process deferred priority service orders when there are no emergency or normal priority service orders to process.

Incoming service orders may be evaluated to ascertain their priority status using priority scanner 111 to quickly scan the entire service order for a limited number of messages. For example, priority scanner 111 may scan a service order for a first predefined set of messages to determine that a service order should be assigned a deferred status. The first predefined set of messages may include the text "DEFERRED," although the first predefined set of messages may be any messages indicating that the work of the service order is of a nature that may be deferred. By way of further example, priority scanner 111 may scan a service order for a second predefined set of messages to determine that a service order should be assigned an emergency status. The second predefined set of messages may include the text "EMERGENCY," although the second predefined set of messages may be any messages indicating that the work of the service order is of an emergency nature. By way of further example, priority scanner 111 may scan a service order for a third predefined set of messages to determine that a service order should be assigned a normal status. The third predefined set of messages may include the text "NORMAL," although the third predefined set of messages may be any messages indicating that the work of the service order should receive a normal priority. If no predefined messages indicating which priority status should be assigned to a service order are found in the service order, the service order may be given a default status of normal. Other methods may be used to determine the priority status to be assigned to a service order. For example, it may be that all service orders originating from a particular source, such as SUDS, may be assigned a deferred priority. The source of a service order may be indicated by a message within the service order. By way of further example, all service orders from another source may be assigned an emergency priority. As another example, service orders with a due date less than a certain period of time away, such as twelve hours, may be assigned an emergency priority. It should be recalled that a due date may be included as a message within a service order. Additionally, all service orders from a particular source may be given as a default a particular priority, with that priority being changed only if predefined messages are found in the service order. One skilled in the art will realize that numerous variations may be made in this regard.

Once service orders have been assigned a priority status, method 200 illustrated in FIG. 2 may be used to efficiently process orders based upon their priority status. In step 210 it is determined whether there are any service orders having emergency status to process. For example, emergency service orders may be placed in a particular directory until completed, meaning that there are emergency service orders to process if that directory is not empty. If the result of step 210 is the conclusion that there are service orders with emergency status to process, those orders are processed in step 215. After the processing of the emergency service orders in step 215, or if the result of step 210 is the conclusion that there are no emergency service orders to process, method 200 proceeds to step 220 to determine whether there are any normal priority service orders to process. Normal service orders may be placed in a particular directory until processed, meaning that there are normal service orders to process if that directory is not empty. If there are normal service orders to process, method 200 may proceed to step 225 to process a predetermined number of normal priority service orders. It should be realized that step 225 may process all existing normal priority service orders. After the predetermined number of normal priority service orders are processed in step 225, or if there are no normal priority service orders identified in step 220, process 200 may proceed to step 227 to determine whether the present time is after a predetermined threshold time. Step 227 may be used, for example, to determine whether method 200 is operating during normal business hours. If the response to step 227 is yes, indicating that the time is after a threshold time, such as a time corresponding to the close of business, method 200 proceeds to step 235 to process a predetermined number of deferred priority service orders. It should be noted that the predetermined number of deferred service orders processed in step 235 may vary, and may vary by time of day. For example, during some times, such as over night, the likelihood of receiving an emergency service order may be extremely low, and the likelihood of receiving even a normal priority service order may be very low. Accordingly, a large number of deferred service orders may be processed in step 235 at certain times while a smaller predetermined number of deferred service orders may be processed at other times. One skilled in the art will further realize that the predetermined number of normal priority service orders processed in step 225 and the predetermined number of deferred service orders processed in step 235 may be different, in that the predetermined number in each step may vary depending upon the amount of time consumed to process service orders in a given system as well as the volume of service orders typical for a system.

Figure 3:
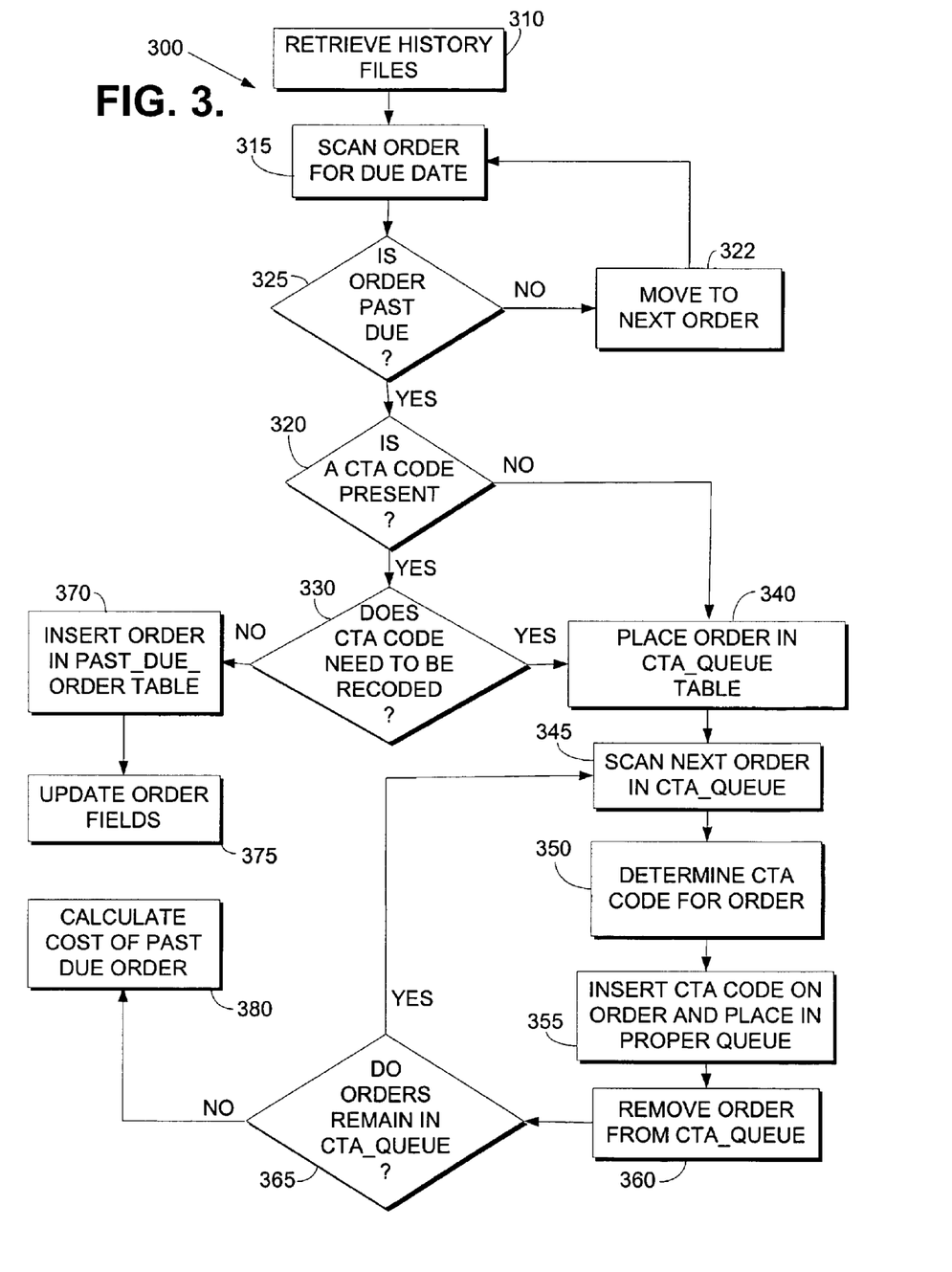
FIG. 3 illustrates a method for processing and analyzing past due orders.

Referring now to FIG. 3, a method 300 for identifying, analyzing and categorizing past due service orders is illustrated. In step 310 history files containing uncompleted service orders are retrieved. In step 315 the service orders in the retrieved history files are scanned for their due dates. Step 315 may utilize the parser 104 and/or analyzer 103 of ARC 102 described in conjunction with FIG. 1a and FIG. 1b. In step 320, it is determined whether a given service order is past due. Step 320 may compare the due date to the present time and conclude that the service order is past due if the present time is later than the due date. If a service order is not past due, step 322 proceeds to the next service order in the file. If a service order is past due, method 300 proceeds to step 325 to determine whether there is an existing CTA code on that service order. A CTA code may be a classification code that designates the type or nature of the service order that is past due. While the term CTA code is used herein, any other term may be used to describe a classification code used in conjunction with method 300. If there is no CTA code identified in step 325, method 300 proceeds to step 340. If there is a CTA code present on the service order identified in step 325, method 300 proceeds to step 330. Step 330 determines whether the existing CTA code on the service order needs to be changed. A CTA code may be changed for any of a large number of reasons, such as the continued passage of time requiring reclassification changes in the requirements of the service order, or the completion of part of a service order, for example. If the CTA code on the service order does need to be changed, method 300 proceeds to step 340. If the CTA code on the service order does not need to be changed, method 300 proceeds to step 370. In step 340, the service order is placed in the CTA_QUEUE table. It should be noted that a queue or table may be used other than a table referred to as CTA_QUEUE table if desired. In step 345, service orders in the CTA_QUEUE table are scanned. In step 350, the appropriate CTA code is determined for the scanned service order. Step 350 may be performed, for example, by analyzer 103 using classification rules included in analysis rules 106 as illustrated in FIG. 1a, although the service order prioritization unit 112 may perform step 350 separately. There may be any number of CTA codes, including one, assigned in step 350, and those codes may be assigned based upon the type of service the service order is for, such as voice service or high speed internet service, may be based upon geographical area, may be based upon the customer type, such as an individual or a business, or any other criteria. Method 300 may then proceed to step 355 wherein the appropriate CTA code is inserted on the service order and the service order is placed in an appropriate web queue. Outbound message system 117 may be used to insert a CTA code on a service order. Placing a service order in a web queue in step 355 allows groups and personnel within the telecommunication service provider to access past due service orders corresponding to a given CTA code to complete those service orders and/or to determine how to avoid similar service orders from going past due in the future. In step 360 the service order is removed from the CTA_QUEUE table. Method 365 then determines whether service orders remain in the CTA_QUEUE table for further processing and, if the result is the conclusion that service orders remain in the CTA_QUEUE table, method 300 returns to step 345 to process the next service order in the CTA_QUEUE. When there are no service orders remaining in the CTA_QUEUE table to process, step 380 calculates the cost of the past due service orders to the telecommunication service provider. Step 380 may calculate the cost of both lost fees and, if applicable, charges. Step 380 allows the telecommunication service provider to quantify the cost of past due service orders to the service provider. This information is useful both in determining what steps to take to resolve the past due orders themselves as well as to determine what steps to take to prevent similar service orders from becoming past due in the future.

If there was a CTA code present as identified in step 325, and if that CTA code was not determined to need to be changed in step 330, method 300 proceeds to step 370. In step 370 the service order is inserted in the PAST_DUE_ORDERS table. In step 375 the service order fields are updated, for example, to correspond to the current date and time, a revised due date, a process date/time, as well as other information.

Figure 4:
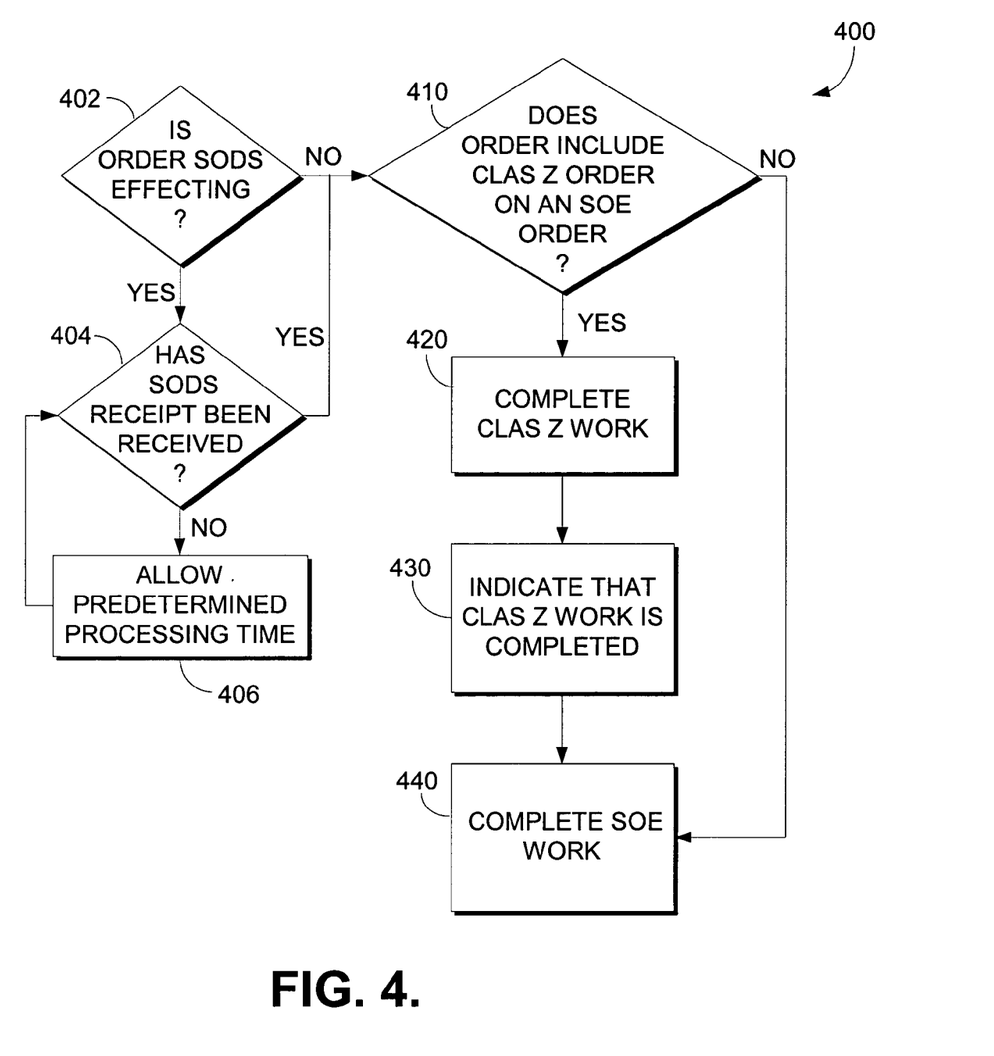
FIG. 4 illustrates a method for ordering the completion of telecommunication service orders.

Referring now to FIG. 4, a method 400 for ordering the processing of a service order is illustrated. Method 400 may be particularly useful, for example, when a service order requires two or more different types of work, sometimes referred to as SODS, CLAS Z, and/or SOE work. SODS work may involve the modification of telephony switches in a telecommunication network. CLAS Z work may involve processes such as the physical installation, manipulation, or connection of telecommunication hardware. SOE work may involve software processing, such as the establishment of billing codes or the automated establishment of services over existing physical resources. Quite frequently for a service order requiring two or more types of work, the CLAS Z work must be completed before the SOE work of a service order may be successfully completed, while SODS work may need to be completed before either the CLAS Z or the SOE work may be successfully completed. While the terms "SODS" and "CLAS Z" and "SOE" are used herein, it should be realized that any terms may be used to describe different types of work that must be done to complete a telecommunication service order. Method 400 prevents the system from attempting to complete SOE work until CLAS Z work required for the service order has been completed, and prevents the system from attempting to complete SOE work and CLAS Z work until any necessary SODS work has been completed. In step 402 it is determined whether a service order is SODS effecting. Step 402 may be performed, for example, by using parser 104 and rules such as analysis rules 106 to determine whether a service order requires SODS work. If the conclusion of step 402 is that a service order is not SODS effecting, method 400 proceeds to step 410. If the conclusion of step 402 is that an order is SODS effecting, method 400 proceeds to step 404. Step 404 determines whether a SODS receipt has been received indicating that the SODS work has been completed. If the conclusion of step 404 is that a SODS receipt has been received, method 400 proceeds to step 410. If the conclusion of step 404 is that a SODS receipt has not been received, method 400 proceeds to step 406, which allows a predetermined amount of time to pass to allow SODS processing to occur. After a predetermined processing time of step 406, step 404 repeats. In step 410 of method 400 it is determined whether the service order includes a CLAS Z order on an SOE order. If not, method 400 proceeds to step 440 to complete the SOE work. If, however, step 410 concludes that both CLAS Z and SOE work is required on a service order, method 400 proceeds to step 420 wherein the service order is routed for the completion of CLAS Z work. In step 430 it is indicated that the CLAS Z work has been completed. Step 430 may comprise, for example, the submission of a work completion notice by individuals or a group responsible for performing the CLAS Z work. Method 400 then proceeds to step 440, wherein the service order is routed to complete the SOE work. Step 440 may often be accomplished using automated systems and processes.

In accordance with the above, a new system and method for the automated routing and completion of telecommunication service orders is provided. The present invention further provides a new method for the prioritization and prioritized processing of telecommunication service orders. The present invention provides a new method for identifying, analyzing, and processing past due telecommunication service orders. The present invention yet further provides a new method for processing telecommunication service orders so that work on the service order is scheduled to allow it to be completed in an efficient fashion without attempting to initiate work that cannot be completed prior to the conclusion of other work on the service order. One skilled in the art will realize that the present invention may be used in a variety of settings to process service orders, but is particularly adapted for use with telecommunication service orders. One skilled in the art will further appreciate that particular names given to the systems and processes described herein, such as SOE, SODS, CTA, CLAS Z, and other systems and methods may be varied, and that other similar systems and methods may be used instead. One skilled in the art will further appreciate that the systems and methods described herein may be implemented using a variety of computing platforms and hardware, and that they may be implemented using any of a variety of software and programming languages, although the use of multi-threaded software may be particularly well adapted to some uses of the present invention.

The invention claimed is:

1. A method for routing telecommunication service orders, the method comprising:
   maintaining a message table, the message table comprising messages that may be found in a service order;
   maintaining analysis rules, the analysis rules providing actions to be taken with a service order based on the messages found in a service order;
   receiving a service order, the service order being a digital image;
   parsing the service order to determine what messages are found in the service order, the parsing further including parsing the service order to determine the location of messages on the digital image of the service order relative to other messages on the service order;
   analyzing the service order by applying the analysis rules to determine at least one action to take with the service order based upon the messages found in the service order; and
   taking at least one of a plurality of actions with the service order, the plurality of actions comprising:
      routing the service order via e-mail for processing; and
      routing the service order to a web queue for processing.

2. The method for routing telecommunication service orders of claim 1, wherein the plurality of actions further comprise:
   printing the service order at a predetermined printer for processing.

3. The method for routing telecommunication service orders of claim 2, wherein the plurality of actions further comprise:

routing the service order to an automated system using TCP/IP FTP procedures for processing.

4. The method for routing telecommunication service orders of claim 3, wherein the plurality of actions further comprise:

routing the service order to an automated system using TCP/IP Sockets procedures for processing.

5. The method for routing telecommunication service orders of claim 4, wherein the plurality of actions further comprise:

routing the service order via fax transmission for processing.

6. The method for routing telecommunication service orders of claim 1, wherein taking at least one of a plurality of actions with the service order further comprises taking more than one of a plurality of actions with a service order.

7. A method for processing telecommunication service orders, the method comprising:

maintaining a message table, the message table comprising messages that may be found in a service order;

maintaining analysis rules, the analysis rules providing actions to be taken with an order based on the messages found in a service order;

receiving a service order, the service order being a digital image;

parsing the service order to determine what messages are found in the service order, the parsing further including parsing the service order to determine the location of messages on the digital image of the service order relative to other messages on the service order;

analyzing the service order by applying the analysis rules to determine at least one action to take with the service order based upon the messages found in the service order; and taking at least one of a plurality of actions with the service order, the plurality of actions comprising:
processing the service order to generate an XML document from the digital image; and
adding an outbound message to the service order.

8. The method for processing telecommunication service orders of claim 7, further comprising:

retaining a copy of every received service order in a history file.

9. The method for processing telecommunication service orders of claim 8, further comprising:

generating from the history file a report of service orders due by a given time that are not yet completed.

10. The method for processing telecommunication service orders of claim 9, wherein the plurality of actions further comprises telephoning the customer who placed the service order upon completion of the service order.

11. A method for processing and routing telecommunication service orders, the method comprising:

maintaining a message table, the message table comprising messages that may be found in a service order;

maintaining analysis rules, the analysis rules providing actions to be taken with a service order based on the messages found in a service order;

receiving a service order, the service order being a digital image;

parsing the service order to determine what messages are found in the service order, the parsing further including parsing the service order to determine the location of messages on the digital image of the service order relative to other messages on the service order;

analyzing the service order by applying the analysis rules to determine at least one action to take with the service order based upon the messages found in the service order; and taking at least one of a plurality of actions with the service order, the plurality of actions comprising:
processing the service order to generate an XML document from the digital image;
adding an outbound message to the service order;
routing the service order via e-mail for processing; and
routing the service order to a web queue for processing.

12. The method for processing and routing telecommunication service orders of claim 11, wherein:

maintaining analysis rules further comprises maintaining rules providing actions to be taken with a service order based on the messages found in a service order, the location of messages on the digital image of a service order, and the location of messages on the service order relative to other messages on a service order; and analyzing the service order by applying the analysis rules further comprises applying the analysis rules to determine at least one action to take with the service order based upon the messages found in the service order, the location of messages on the digital image of the service order, and the location of messages on the service order relative to other messages on the service order.

13. The method for processing and routing telecommunication service orders of claim 12, wherein the plurality of actions further comprises:

routing the service order to an automated system using TCP/IP FTP procedures for processing; and routing the service order to an automated system using TCP/IP Sockets procedures for processing.

14. The method for processing and routing telecommunication service orders of claim 13, further comprising:

retaining a copy of every received service order in a history file.

15. The method for processing and routing telecommunication service orders of claim 14, further comprising:

generating from the history file a report of service orders due by a given time that are not yet completed.

16. The method for processing and routing telecommunication service orders of claim 15, further comprising:

generating from the history file a report of incomplete service orders past their due date.

17. The method for processing and routing telecommunication service orders of claim 16, wherein the plurality of actions further comprise:

printing the service order at a predetermined printer for processing.

18. A computer readable medium containing computer readable code embodied thereon for causing a computer to perform a method for routing telecommunication service orders, the method comprising:

maintaining a message table, the message table comprising messages that may be found in a service order;

maintaining analysis rules, the analysis rules providing actions to be taken with a service order based on the messages found in a service order;

receiving a service order, the service order being a digital image;

parsing the service order to determine what messages are found in the service order, the parsing further including parsing the service order to determine the location of messages on the digital image of the service order relative to other messages on the service order;

analyzing the service order by applying the analysis rules to determine at least one action to take with the service order based upon the messages found in the service order; and taking at least one of a plurality of actions with the service order, the plurality of actions comprising:
routing the service order via e-mail for processing; and
routing the service order to a web queue for processing.

19. The computer readable medium of claim 18, wherein:
maintaining analysis rules further comprises maintaining rules providing actions to be taken with a service order based on the messages found in a service order, the location of messages on the digital image of a service order, and the location of messages on the service order relative to other messages on a service order.

20. The computer readable medium of claim 19, wherein the plurality of actions further comprise:
routing the service order to an automated system using TCP/IP FTP procedures for processing;
routing the service order to an automated system using TCP/IP Sockets procedures for processing;
routing the service order via fax transmission for processing; and
printing the service order at a predetermined printer for processing.

21. A computer readable medium containing computer readable code embodied thereon for causing a computer to perform a method for processing telecommunication service orders, the method comprising:
maintaining a message table, the message table comprising messages that may be found in a service order;
maintaining analysis rules, the analysis rules providing actions to be taken with a service order based on the messages found in a service order;
receiving a service order, the service order being a digital image;
parsing the service order to determine what messages are found in the service order, the parsing further including parsing the service order to determine the location of messages on the digital image of the service order relative to other messages on the service order;
analyzing the service order by applying the analysis rules to determine at least one action to take with the service order based upon the messages found in the service order; and
taking at least one of a plurality of actions with the service order, the plurality of actions comprising:
processing the service order to generate an XML document from the digital image; and
adding an outbound message to the service order.

22. The computer readable medium of claim 21, wherein:
maintaining analysis rules further comprises maintaining rules providing actions to be taken with a service order based on the messages found in a service order, the location of messages on the digital image of a service order, and the location of messages on the service order relative to other messages on a service order.

23. The computer readable medium of claim 22, wherein the method for processing telecommunication service orders further comprises:

retaining a copy of every received service order in a history file;
generating from the history file a report of service orders due by a given time that are not yet completed; and
generating from the history file a report of incomplete service orders past their due date.

24. A computer readable medium containing computer readable code embodied thereon for causing a computer to perform a method for processing and routing telecommunication service orders, the method comprising:
maintaining a message table, the message table comprising messages that may be found in a service order;
maintaining analysis rules, the analysis rules providing actions to be taken with a service order based on the messages found in the service order;
receiving a service order, the service order being a digital image;
parsing the service order to determine what messages are found in the service order, the parsing further including parsing the service order to determine the location of messages on the digital image of the service order relative to other messages on the service order;
analyzing the service order by applying the analysis rules to determine at least one action to take with the service order based upon the messages found in the service order; and
taking at least one of a plurality of actions with the service order, the plurality of actions comprising:
processing the service order to generate an XML document from the digital image;
adding an outbound message to the service order;
routing the service order via e-mail for processing; and
routing the service order to a web queue for processing.

25. The computer readable medium of claim 24, wherein:
maintaining analysis rules further comprises maintaining rules providing actions to be taken with a service order based on the messages found in a service order, the location of messages on the digital image of a service order, and the location of messages on the service order relative to other messages on a service order.

26. The computer readable medium of claim 25, wherein:
retaining a copy of every received service order in a history file;
generating from the history file a report of service orders due by a given time that are not yet completed; and
generating from the history file a report of incomplete service orders past their due date.

27. The computer readable medium of claim 19, wherein the plurality of actions further comprise:
routing the service order to an automated system using TCP/IP FTP procedures for processing;
routing the service order to an automated system using TCP/IP Sockets procedures for processing;
routing the service order via fax transmission for processing; and
printing the service order at a predetermined printer for processing.

* * * * *